Dec. 22, 1959  I. BALINKIN ET AL  2,917,836
DEVICE FOR DEMONSTRATING COLOR MIXTURE
Filed Oct. 6, 1958  2 Sheets-Sheet 1

INVENTORS.
ISAY BALINKIN
AND
BY CHARLES HARRISON DWIGHT.
Allen + Allen
ATTORNEYS.

Dec. 22, 1959  I. BALINKIN ET AL  2,917,836
DEVICE FOR DEMONSTRATING COLOR MIXTURE
Filed Oct. 6, 1958  2 Sheets-Sheet 2

INVENTOR.
ISAY BALINKIN, AND
BY CHARLES HARRISON DWIGHT.
Allen & Allen
ATTORNEYS.

United States Patent Office 2,917,836
Patented Dec. 22, 1959

2,917,836

DEVICE FOR DEMONSTRATING COLOR MIXTURE

Isay Balinkin and Charles Harrison Dwight, Cincinnati, Ohio

Application October 6, 1958, Serial No. 765,366

14 Claims. (Cl. 35—28.3)

The invention relates to an instruction device, such as may be readily employed in a classroom, to demonstrate the phenomena of color mixture. While many students have some experience of additive color mixture, there is need of a means for demonstrating subtractive color phenomena, and for aiding the student in understanding and drawing the necessary distinctions between additive and subtractive color phenomena.

It is an object of the invention to provide an instruction device capable of giving a simple and graphic demonstration of subtractive color mixture.

It is an object of the invention to provide an instruction device for studying subtractive color mixture, with which the student may simultaneously observe two or more filters individually and in combination, in their action on transmitted light.

It is an object of the invention to provide a device with which the student may observe the action of filters individually and in combination and at the same time observe transmittance curves for the filters, both individually and in superposed position, whereby the student can estimate or calculate the transmittance curve of the combination of filters.

It is an object of the invention to provide an instruction device which may be handled and used by the individual student, or which by projection, may be viewed simultaneously by a number of students as in a classroom demonstration.

It is an object of the invention to provide an instruction device for the study of subtractive color phenomena wherein a relatively large number of colors may be observed and studied, starting with a relatively small number of filters. For example, in certain embodiments of the device of this invention, a total of sixteen colors may be observed and studied on the basis of only eight filters.

It is an object of the invention in certain of its embodiments to provide an instruction device which while capable of illustrating subtractive color phenomena can also be used to produce and illustrate additive color phenomena.

These and other objects of the invention which are set forth hereinafter or will be apparent to one skilled in the art upon reading these specifications, are accomplished by that construction and arrangement of parts and in that procedure of which certain exemplary embodiments will now be described. Reference is made to the accompanying drawings wherein.

Figure 1:
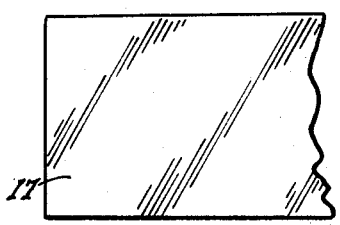
Figure 1 is a fragmentary elevational view of a cover member which may be employed in making a slide element of one embodiment of the invention.

Where the human eye receives substantially equal intensities of all of the wave lengths comprised in the visible spectrum, the sensation resulting therefrom will be white or a shade of grey. Where, however, the eye receives a single wave length or a plurality of wave lengths less than the total number in the visible spectrum, or a plurality of wave lengths which are disparate in intensity, the eye performs an integrating operation and the sensation in one of a particular color, having qualities of hue, brightness and saturation. In some exceptional and unique cases a proper selection of the spectrum regions and intensities can produce white. The average student has some familiarity with pigment or colorant mixture, wherein the combination of blue and yellow will give a green. But the average student has difficulty in maintaining a mental distinction between additive and subtractive color phenomena. He tends to confuse the two, and tends also to expect in subtractive color phenomena the same integrated impressions that are observed in additive phenomena.

Where white light from a source passes through a filter, the emergent beam will contain only those wave lengths which the filter is capable of transmitting, and the intensities of the transmitted wave lengths will vary in accordance with the specific transmission of the filter, wave length by wave length. If the emergent beam is then passed through a second filter, the same phenomenon occurs; but the wave lengths impinging upon the second filter will be further affected by its specific transmission, again wave length by wave length. Thus if the transmission of the first filter is confined to wave lengths with respect to which the second filter is opaque, it will be evident that the filter combination will be opaque. Similarly, if the first filter passes some part of all of the wave lengths in the visible spectrum, or at least a broad band of wave lengths in different intensities, and the second filter still further modifies the wave length combination in the transmitted light, the light emerging from the second filter may produce an integrated impression on the eye having a hue apparently unrelated to the integrated impression which the eye would receive from light passing through either of the filters alone. By way of illustration it is readily possible with a series of filters which produce to the eye integrated yellow impressions, and a series of filters which produce to the eye integrated blue impressions, to secure by combining these filters either complete opacity, or color impressions ranging substantially throughout the entire visible spectrum, and including gray.

The device of this invention enables the student to demonstrate these effects by combining different filters, while at the same time observing the visual impression produced by each of the filters so combined.

By means of the spectrophotometer, the transmittance curve of any filter is readily obtained. Such a curve shows the relative intensity of transmitted light at the respective wave lengths throughout the visible region. In the device of this invention such curves are associated with the individual filters to which they appertain, and are so arranged that when the filters are superposed for obtaining the subtractive effect, the curves are also superposed. The student can thus readily estimate or actually obtain a transmittance curve for the combination of filters, since the transmittance curve for the combination, at any point, is the product of the transmittance at that point of the individual filters.

In one aspect of the invention, a filter and its transmittance curve may be located on a support, and this combination may be juxtaposed to another similar combination containing a different filter and its transmittance curve in such fashion as to combine the filters in the path of a light beam and combine the curves for the purpose indicated above. It is a feature of the invention, also, that the filters are so configured and arranged that a portion of each filter lies off-side the corresponding portion of the other filter so that a student can observe simultaneously the effect of the individual filters on the incident light, and their combined effect thereon. At the same time the curves will be superposed.

In a more elaborate embodiment of the invention there will be a fixed support and a movable support each bearing a plurality of filters and their respective transmittance curves, the elements being positionable with respect to each other in various ways resulting in the ability to provide in a single device either successively or simultaneously a plurality of combinations.

The devices of this invention may be individually operated by students, and observed by them against a suitable light source. Or they may be located in a projector and images thereof thrown upon a suitable screen for the instruction of a group of students. It is characteristic of the devices of this invention that their effective use is not dependent upon the specific whiteness of any particular light source. They may be effectively used with any light source emitting reasonable quantities of the various wave lengths in the visible spectrum.

Figure 8:
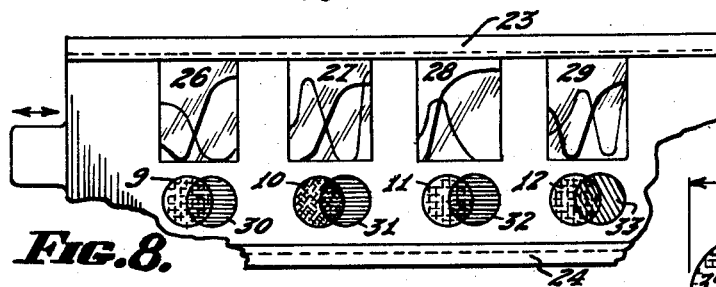
Figure 8 is a fragmentary front elevational view of the combination of fixed and movable slide elements.

The invention, as illustrated in an exemplary embodiment in Figures 1 and 8 inclusive, comprises two elements or members which may be referred to as a fixed slide and a movable slide. Each of these comprises a transparent body, which will bear a series of color filters and a series of transmittance curves located adjacent the color filters to which they appertain. The movable element will be slidably mounted with respect to the fixed element, to which end the edges of the fixed element may be bent over to form guides, or grooved elements may be attached to its edges. The positioning of the curves, or charts containing the curves, on the two elements is such that by relative sliding movements any chart on the movable member may be brought into juxtaposition with any chart on the fixed member; and the positioning of the color filters on the two elements is such that when the charts are juxtaposed as aforesaid the appropriate filters on the two elements will overlap to give the subtractive effect. It is preferable, however, to offset the filters on one of the elements with respect to the filters on the other element so that when the charts are juxtaposed the filters will not fully coincide, but instead portions of each filter will extend beyond the other at each side. Thus the viewer can see the subtractive effect of the two filters in overlapping position, and can also see light transmitted through a portion of each filter individually.

The charts and the filters may be imposed upon the transparent members in various ways as by printing or photographically. However, it is convenient and generally preferable to build up the elements from individual pieces as hereinafter set forth. This permits the use of commercially manufactured filters, such for example as those consisting of dyed gelatin films, which filters can be obtained with definite and carefully controlled transmissivities. The actual shapes and sizes of the filters may be varied within the space limits of the device. In Figures 1 to 10 inclusive circular filters are illustrated.

As to the charts, these may be printed or drawn on transparent material and affixed to the base elements of the device in any suitable fashion. When the charts are juxtaposed in the use of the device, it is convenient and valuable to provide some means whereby the juxtaposed charts can be distinguished one from another and correlated with their appropriate filters. One way of doing this is by printing the curves on the charts in the color of the filter to which they appertain. There are, however, other ways of accomplishing essentially the same purpose. The charts may be formed from a material which is translucent but not fully transparent. When this is done, and the charts are juxtaposed, the chart located toward the viewer's eye will appear with its curve more strongly outlined and hence distinguishable from the curve on the furthest chart.

Further it has been found that the visual effectiveness of the device is improved by rendering all portions of the fixed and movable slide members opaque excepting for those portions where the charts and filters are located. This may be accomplished by the application of opaquing materials to the bodies of the slide members, or it may be accomplished through the use of a suitable mask with cutouts in it, such as a mask made from black paper or opaque film-like material.

Figure 4:
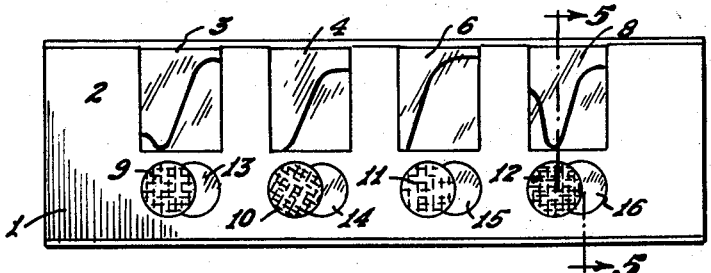
Figure 4 is a front elevation of the movable slide element of one embodiment of the invention.

In Figure 4 the index numeral 1 indicates a transparent body such as a body of glass or clear plastic. A mask, such as has been discussed above, is indicated at 2. A series of four charts is shown at 3, 4, 6 and 8, the charts being spaced equally from each other, and located in openings in the mask. Filters appropriate to the charts are indicated at 9, 10, 11 and 12. It will be noted that the openings in the mask in which these filters are located have lateral extensions 13, 14, 15 and 16 through which light can be transmitted directly to portions of off set filters on the fixed slide element.

Figure 2:
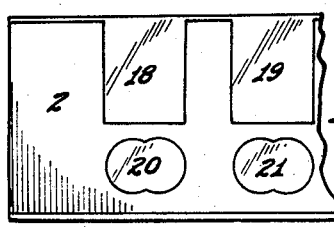
Figure 2 is a fragmentary elevational view of a cover element in combination with a mask.
Figure 3:
Figure 3 illustrates a typical translucent transmittance curve and a filter disc.
Figure 5:
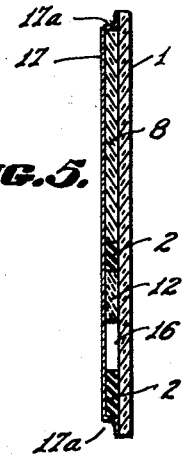
Figure 5 is a sectional view of the movable element taken along the section line 5—5 of Figure 4.

One convenient mode of assembly will be apparent from an examination of Figures 1, 2 and 5. A thin, transparent film of substance such as cellulose acetate, mylar or the like, which has been coated with a pressure sensitive adhesive is shown in Figure 1 at 17. The mask 2, as shown in Figure 2, may be laid down upon the pressure sensitive surface of this sheet and caused to adhere thereto. The mask has openings 18, 19 etc. for the charts and openings 20 and 21 for the filters. The individual filters may be laid in these openings and caused to adhere to the pressure sensitive surface; and the charts are mounted in their openings in the same way. Next a suitable adhesive may be applied to the free side of the mask 2, and the preformed structure applied to the transparent base 1 as will be clear from Figure 5. Edges of the mylar sheet 17, which project beyond the mask, may be adhered directly to the base 1 as indicated at 17a.

Figure 6:
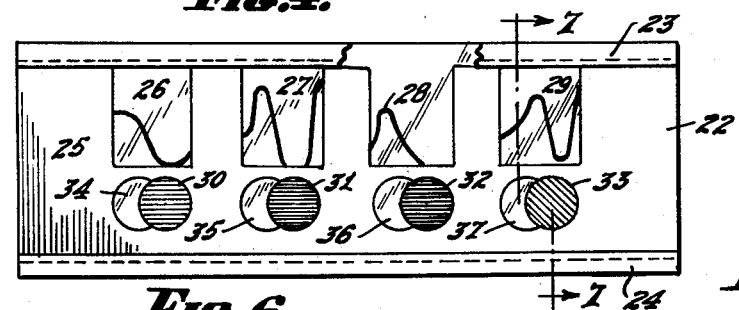
Figure 6 is a front elevational view of the fixed member of the slide combination.
Figure 7:
Figure 7 is a sectional view taken along the section line 7—7 of Figure 6, the movable slide being indicated in place by broken lines.
Figure 10:
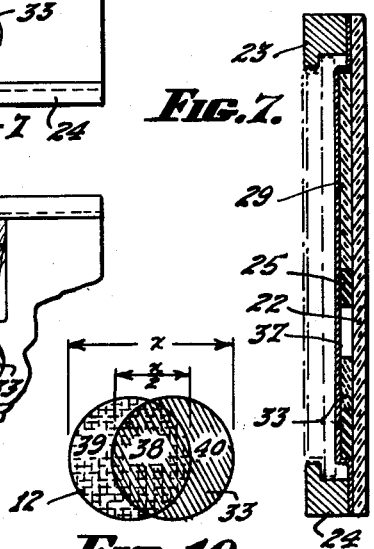
Figure 10 illustrates the relative amount of overlapping of the filters when the fixed and movable slides of Figure 8 or the individual slides of Figure 9 are properly aligned.

The fixed slide element, illustrated in Figures 6 and 7, comprises a transparent base 22. The edges of this base may be turned over to form a slide for the movable member, or elements 23 and 24 of L-shaped cross section may be affixed to the side edges of the base 22 either by cementing or by means of screws, rivets and the like. The fixed slide element may also be provided with a mask 25 having openings therein for the charts 26, 27, 28 and 29, and other openings for the filters 30, 31, 32 and 33. It will be noted that the filter openings in the mask 25 have lateral enlargements 34, 35, 36 and 37 extending to the opposite side from the corresponding extensions 13, 14, 15 and 16 of the filter openings in the mask 2 of the movable slide element. It will also be noted from Figure 3 that the filter 9 is located with its center somewhat to the left of the midpoint of the chart 3 in the movable slide member. In the fixed slide member the filter center points will correspondingly be located somewhat to the right of the centers of the charts. Thus, when the charts are juxtaposed as in the combined device, Figure 8, the respective filters will not fully overlap. The preferred relationship is shown in Figure 10 where two filters 12 and 33 are shown in partially overlapped position. The overlapping portions of these filters, indicated at 38, forms an area in which subtractive color phenomena are visible, which area is about twice as wide as the free portions of the two filters, indicated at 39 and 40. It will be evident that when light passes through the device to the eye of the observer, he will see not only the colors of the individual filters, but the combined effect of the two filters on the transmitted light.

It will also be evident that the slide form of the device, hereinabove described, permits the juxtaposition of any chart on the movable member to any chart on the fixed member with overlapping of the respective filters, so that a comparatively large number of combinations may be produced by the student.

In the formation of a slide type of structure, variations of construction are possible. The fixed slide element may comprise a sheet of metal or other opaque material, with cutouts in it to disclose the charts and the filters. The portion of the device shown in Figure 6 may be housed in this metal member; or if the edges of the metal member are turned over to provide slide guides, the elements 23 and 24 may be omitted. It is possible also to use a mask member 2 or 25 of thin but relatively stiff opaque material, cover one side of it with pressure sensitive mylar sheeting, mount the filters and charts as hereinabove described, and then cover the opposite side with a similar piece of pressure sensitive mylar sheeting. A series of elements so formed may be used in a metal slide member, with openings therein, such as has just been described.

Figure 9:
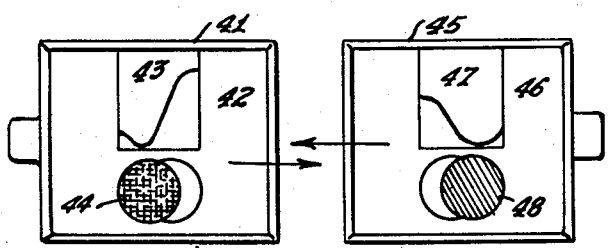
Figure 9 shows another embodiment of the invention in the form of individual lantern slides.

The slide devices disclosed herein may be of such size that they can be placed within the gate of a projector and one or more of the combinations presented by them projected upon a screen for study by a class or group of students. Where instruction by projection is intended, a form of the device as shown in Figure 9 may be found preferable. Here two series of lantern slides are made up for individual and combined projection. The slides of the first series, illustrated to the left in Figure 9, will comprise a transparent base 41, a mask 42 having openings therein, a transmissivity chart 43, and a filter 44 off-set somewhat to the left. The slides of the second series, illustrated to the right in Figure 9 will comprise a transparent base 45, a mask 46, a chart 47 and a filter 48 off-set somewhat to the right of the center line of the chart. A lantern slide of the first series may be combined with a lantern slide of the second series and projected simultaneously upon a screen. The screen image will then consist of the juxtaposed and combined images of the two charts, and an image of the two filters in partially overlapping condition as illustrated in Figure 10.

The lantern slide type of structure illustrated in Figure 9 has another advantage for classroom instruction. It is readily possible, through the use of two projectors, to introduce a slide of the first series into one and a slide of the second series into the other, and project images thereof so that the chart images coincide on a single screen. When this is done, the light passing through the filter of one slide and the light passing through the filter of the other slide provide an additive color effect on the screen. Thus the instructor, using the same slides is enabled to demonstrate both additive and subtractive color phenomena and to contrast the two. The superposed images of the charts are as appropriate for additive color work as for subtractive color work, since the wave lengths transmitted by the two filters and combined upon the screen will be the algebraic sum of the specific transmissivities at these wave lengths of the two filters.

Figure 11:
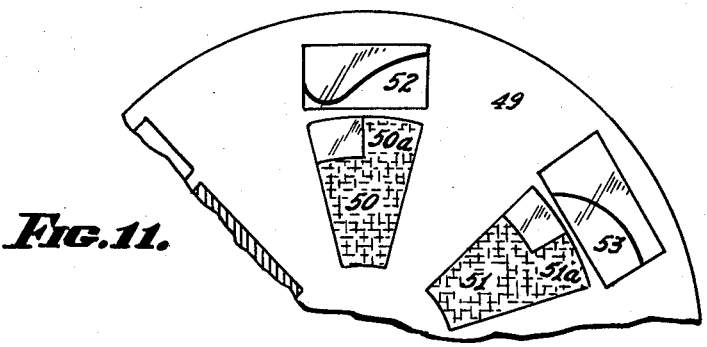
Figure 11 is a fragmentary plan view of the fixed member in a rotary form of the invention.
Figure 12:
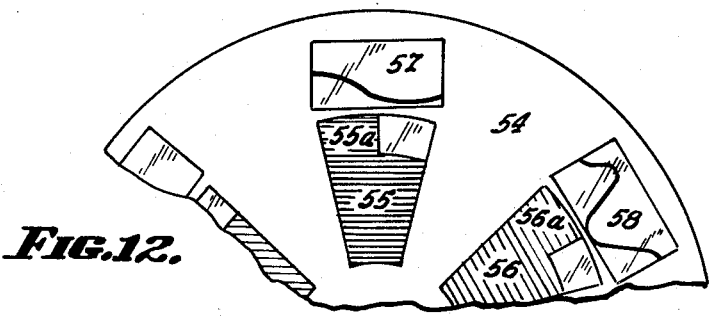
Figure 12 is a fragmentary elevational view of the rotary member of the same combination.
Figure 13:
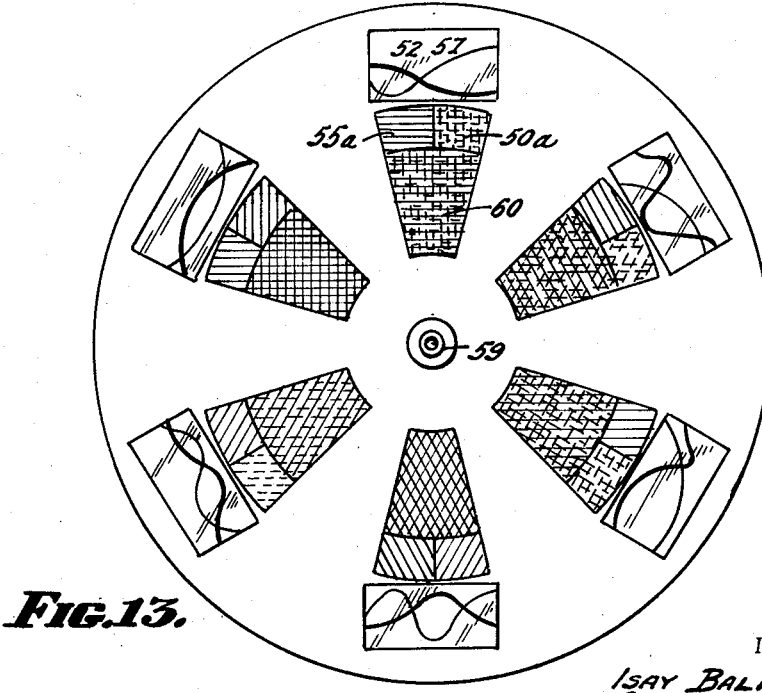
Figure 13 is a plan view showing the combination of the two rotary elements illustrated in Figures 11 and 12.

Another form of the device of this invention is illustrated in Figures 11, 12 and 13. Here two circular elements are provided which are pivoted to each other at their centers for relative rotation. One element, for convenience called a stationary element, is partially illustrated in Figure 11. It will consist of a suitable transparent base, surmounted by a mask 49 with cutouts in it. Segmental filters 50, 51 etc. are provided in certain of these openings, the segmental filters having extensions 50a, 51a etc. at one side. Graphs, transmission curves 52, 53 etc. are located adjacent the filter segments in other appropriate openings in the mask 49.

The other element, for convenience called a rotary element, is partially illustrated in Figure 12. It comprises a suitable mask 54 with openings therein, segmental filters 55, 56 etc. having extensions at the other side as at 55a, 56a etc. Located in certain of these openings, and appropriate transmission curves 57 and 58 etc. located in other openings therein. When the two elements are superposed as shown in Figure 13 and pivoted together as by means of a central rivet, grommet or the like, 59, it will be evident that a plurality of combinations of filters and charts may be made by adjusting the respective rotary positions of the two elements. Thus, charts 52 and 57 can be seen in juxtaposed position when segmental filters 50 and 55 are juxtaposed. Where these filters overlap, as at 60 the subtractive color phenomena herein discussed will be apparent. At the same time the extensions 55a and 50a of the respective segmental filters will not be overlapped and will display the colors of the individual filters.

The structure of Figures 11, 12 and 13 provides generally for a greater ease of construction in a device of a given size than would be possible in a slide type device.

Modifications may be made in the invention without departing from the spirit of it. The invention having been described in certain exemplary embodiments what is claimed as new and desired to be secured by Letters Patent is:

1. In a color demonstration device a first transparent member bearing a color filter of limited extent and adjacent said color filter a translucent chart bearing a transmittance curve appropriate to said filter, and a second transparent member bearing a color filter of limited extent and adjacent said filter a translucent chart bearing a transmittance curve appropriate to said filter, the arrangement of said filters and said charts on said members being such that said charts can be brought into registry and said filters into at least partial overlapping position for viewing by transmitted light.

2. The structure claimed in claim 1 wherein said transparent members are rendered opaque excepting for the areas of said charts and the area occupied by both said filters when said charts are in registry.

3. The structure claimed in claim 1 wherein the filters on said respective members are oppositely off-set with reference to their charts so that when said charts are in registry said filters overlap in part only, each filter extending beyond the overlapping area in an opposite direction.

4. The structure claimed in claim 3 wherein said transparent members are rendered opaque excepting for the areas of said charts and the area occupied by both said filters when said charts are in registry.

5. In a color demonstration device, two relatively movable elements, each element bearing a plurality of color filters and a plurality of charts each bearing a transmittance curve for one of said color filters and located adjacent the filter to which it appertains, said charts also being spaced at regular intervals, said elements being transparent at least in the areas of said charts and filters, and being so mounted for relative movement that any chart on one element may be brought into registry with any chart on the other element, the filters being so positioned that when said charts are in registry the filters to which said charts appertain will overlap each other at least in part.

6. The structure claimed in claim 5 wherein said movable elements are opaque excepting in the areas of said charts and in the combined areas occupied by the overlapping filters.

7. The structure claimed in claim 5 wherein said movable elements are generally circular in contour and are pivoted to each other for relative rotary movement, said filters and charts being radially arranged on said elements.

8. The structure claimed in claim 5 wherein said movable elements are generally circular in contour and are pivoted to each other for relative rotary movement, said filters and charts being radially arranged on said elements, the filters on each element having extensions of minor area, and the extensions on said filters being of opposite hand on the two elements, whereby when said charts are registered and said filters overlapped, said extensions will be presented individually to a beam of light passing through said structure.

9. The structure claimed in claim 8 wherein said movable elements are opaque excepting in the areas of said charts and in the areas occupied by the overlapping filters.

10. The structure claimed in claim 9 in which said filters are segmental in shape and in which said extensions are directed radially.

11. The structure claimed in claim 5 wherein said movable elements are of elongated form, and one of said movable elements is mounted to slide in the direction of its length with respect to the other.

12. The structure claimed in claim 11 wherein said charts and filters are juxtaposed to each other transversely of said elements, the filters of one element being off-set with respect to the filters of the other element when said charts are in registry so that said filters overlap in part only, leaving a non-overlapped portion of each filter for viewing by transmitted light.

13. The structure claimed in claim 12 wherein said movable elements are opaque excepting in the areas of said charts and in the combined areas of said overlapping filters.

14. The structure claimed in claim 5 wherein said curves are reproduced on said charts in a color substantially similar to the color of the filters to which the charts appertain.

No references cited.